(12) United States Patent
Kozlowski et al.

(10) Patent No.: US 12,016,320 B2
(45) Date of Patent: Jun. 25, 2024

(54) MULTIPURPOSE COMPOSTABLE ABSORPTION MAT

(71) Applicant: UPZ GLOBAL LLC, Fort Lauderdale, FL (US)

(72) Inventors: Kimberly Kozlowski, Fort Lauderdale, FL (US); John Jun Cai, Williamsville, NY (US); Joseph Curcio, Gray, ME (US)

(73) Assignee: UPZ GLOBAL LLC, Fort Lauderdale, FL (US)

( * ) Notice: Subject to any disclaimer, the term of this patent is extended or adjusted under 35 U.S.C. 154(b) by 160 days.

(21) Appl. No.: 17/084,276

(22) Filed: Oct. 29, 2020

(65) Prior Publication Data

US 2021/0122546 A1    Apr. 29, 2021

Related U.S. Application Data

(60) Provisional application No. 62/927,164, filed on Oct. 29, 2019.

(51) Int. Cl.
*A01K 97/05* (2006.01)
*A01K 63/02* (2006.01)
(Continued)

(52) U.S. Cl.
CPC .............. *A01K 97/05* (2013.01); *A01K 63/02* (2013.01); *A01K 63/047* (2013.01); *B32B 1/00* (2013.01);
(Continued)

(58) Field of Classification Search
CPC ............ B32B 3/266; B32B 2307/7265; B32B 2307/726; B32B 2307/7163; B32B 9/06; B32B 9/02; B65H 35/002
See application file for complete search history.

(56) References Cited

U.S. PATENT DOCUMENTS

| 6,274,232 | B1 | 8/2001 | Otten et al. |
| 6,468,646 | B2 | 10/2002 | Carson et al. |
| 7,078,088 | B2 * | 7/2006 | Price ...................... B32B 27/00 428/137 |
| 7,874,266 | B2 | 1/2011 | Axelrod |

(Continued)

OTHER PUBLICATIONS

Perfect Crust Pizza Liner, Pizza Liners, 2020, https://perfectcrust.com/product/pizza-liners/.

*Primary Examiner* — Michael C Miggins
(74) *Attorney, Agent, or Firm* — Pandiscio & Pandiscio

(57) ABSTRACT

A multipurpose compostable absorption mat serves to receive and encapsulate organic matter for compostable disintegration of the mat and organic matter simultaneously. The mat comprises at least three portions: a first portion facing the organic matter defined by a parchment paper or parchment-like material having multiple pinholes or other openings or porosity sized and dimensioned to enable passage of greases and/or liquids; a second portion outboard of the first portion defined by a deliquescent material, and is able to absorb the greases and/or liquids from the first portion through a capillary mechanism; and a third portion outboard of the second portion defined by an impermeable plant/corn starch-based plastic-like material. The third portion looks and feels like plastic film. The at least three portions of the mat may be formed as at least three discrete layers, with the three discrete layers attached to one another so as to form the mat, with the mat having a thickness in the range from about that of a sheet of paper or a paper towel or a napkin to about ¾" or more.

20 Claims, 11 Drawing Sheets

(51) Int. Cl.

| | |
|---|---|
| *A01K 63/04* | (2006.01) |
| *B32B 1/00* | (2024.01) |
| *B32B 3/26* | (2006.01) |
| *B32B 9/02* | (2006.01) |
| *B32B 9/06* | (2006.01) |
| *B65B 11/00* | (2006.01) |
| *B65D 65/10* | (2006.01) |
| *B65D 65/40* | (2006.01) |
| *B65D 65/46* | (2006.01) |
| *B65D 83/08* | (2006.01) |
| *B65H 35/00* | (2006.01) |

(52) U.S. Cl.
CPC ............... *B32B 3/266* (2013.01); *B32B 9/02* (2013.01); *B32B 9/06* (2013.01); *B65B 11/004* (2013.01); *B65D 65/10* (2013.01); *B65D 65/40* (2013.01); *B65D 65/466* (2013.01); *B65D 83/0882* (2013.01); *B65H 35/002* (2013.01); *B32B 2307/7163* (2013.01); *B32B 2307/726* (2013.01); *B32B 2307/7265* (2013.01); *B32B 2439/62* (2013.01); *B32B 2439/70* (2013.01)

(56) References Cited

U.S. PATENT DOCUMENTS

| | | | |
|---|---|---|---|
| 9,949,593 | B2 | 4/2018 | Pugh |
| 10,272,631 | B2 | 4/2019 | Pugh et al. |
| 10,314,429 | B2 | 6/2019 | Pugh |
| 2002/0136871 | A1* | 9/2002 | Lockett .............. D04H 1/60 156/283 |
| 2003/0121802 | A1 | 7/2003 | MacQuoid |
| 2006/0255507 | A1 | 11/2006 | Bowden et al. |
| 2007/0122599 | A1 | 5/2007 | Furlong |
| 2011/0217201 | A1 | 9/2011 | Jensen et al. |
| 2011/0236664 | A1 | 9/2011 | Ortolani et al. |
| 2013/0095216 | A1 | 4/2013 | Pugh et al. |
| 2013/0199380 | A1 | 8/2013 | Pugh |
| 2013/0243912 | A1 | 9/2013 | Jensen et al. |
| 2015/0048554 | A1 | 2/2015 | Karrer et al. |
| 2017/0190159 | A1 | 7/2017 | Crooks et al. |
| 2017/0305634 | A1* | 10/2017 | Farrell .............. B65D 81/264 |
| 2017/0368779 | A1 | 12/2017 | Pugh et al. |
| 2018/0140469 | A1* | 5/2018 | Kane ............... A61F 13/15252 |
| 2018/0235399 | A1 | 8/2018 | Pugh |
| 2019/0134962 | A1 | 5/2019 | Poppe et al. |
| 2019/0255796 | A1 | 8/2019 | Pugh et al. |
| 2019/0290057 | A1 | 9/2019 | Pugh |

\* cited by examiner

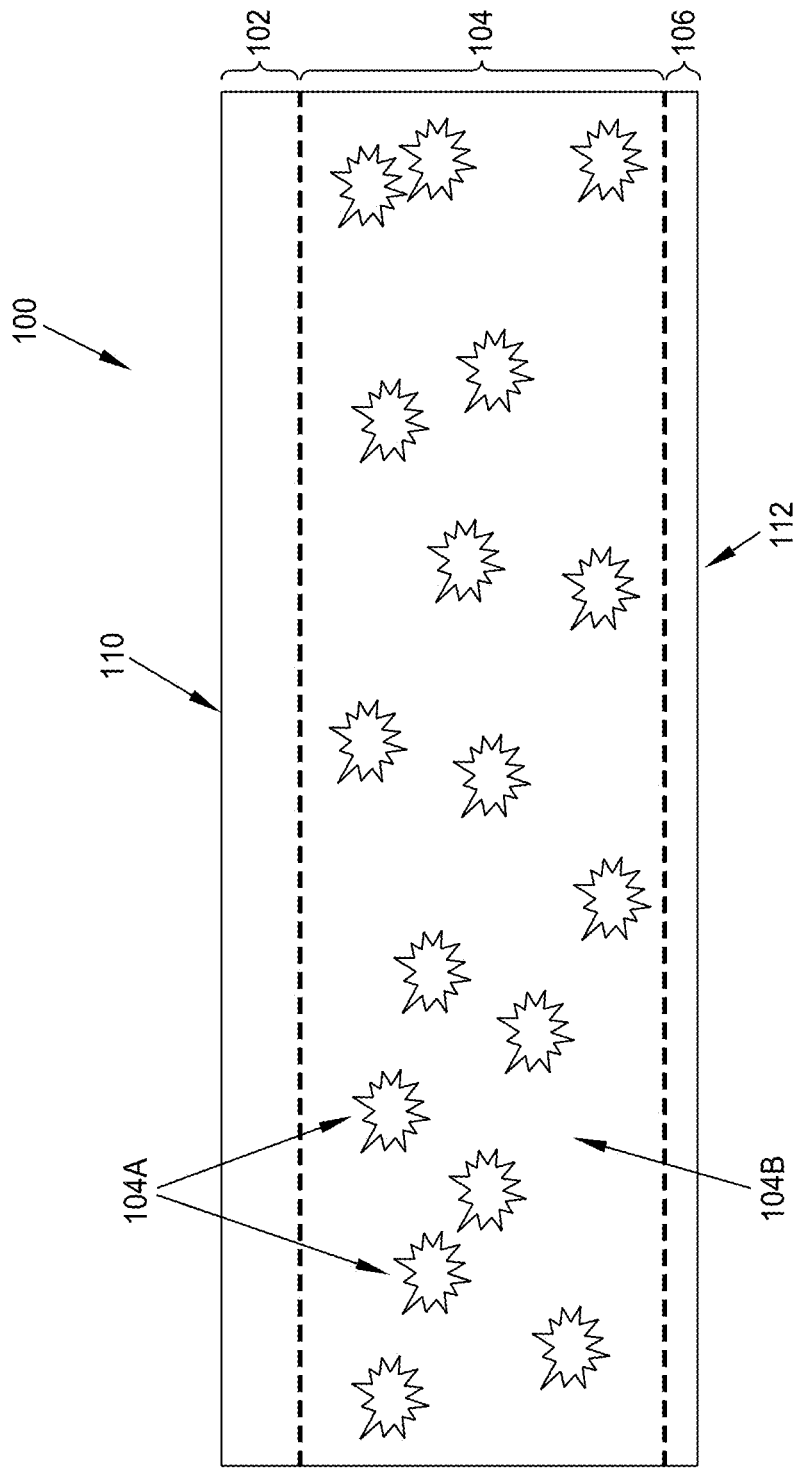

MULTIPURPOSE COMPOSTABLE ABSORPTION MAT

REFERENCE TO PENDING PRIOR PATENT APPLICATION

This patent application claims benefit of prior U.S. Provisional Patent Application Ser. No. 62/927,164, filed Oct. 29, 2019 by Kimberly Kozlowski et al. for A MULTIPURPOSE COMPOSTABLE ABSORPTION MATT, which patent application is hereby incorporated herein by reference.

FIELD OF THE INVENTION

This invention relates to the food industry in general, and more particularly to paper products for supporting and containing food products.

BACKGROUND OF THE INVENTION

Paper products are used extensively in the food industry for supporting and containing food products.

By way of example but not limitation, in the so-called "fast food sandwich industry", a paper "mat" may be used to (i) support a sandwich as the sandwich is being prepared in a sandwich shop, (ii) wrap the sandwich before it is handed to the customer and transported to the location where the sandwich is to be eaten, and (iii) contain any food remnants which are to be discarded.

While such paper products may be convenient for the food provider and the customer, they suffer from a number of limitations. By way of example but not limitation, some paper products may provide a good surface for food preparation and/or cutting, but they may provide only nominal absorption of liquids (e.g., water, grease, etc.). Other paper products may provide good absorption of liquids but may not be easily foldable, so they may not be useful for wrapping the food item. Still other paper products may provide good absorption of liquids and/or be easily foldable, but they may not be capable of encapsulating the food product (e.g., water or liquid absorbed by the paper product may pass completely through the paper product, resulting in a "leaky" or "messy" bundle).

In addition to the foregoing, many of the paper products are not compostable. As a result, paper products encapsulating food remnants may not be suitable for composting with the food products.

SUMMARY OF THE INVENTION

These and other issues are addressed by the provision and use of the present invention, which generally comprises a multipurpose compostable absorption mat (hereinafter sometimes referred to herein as "the mat").

More particularly, the multipurpose compostable absorption mat is adapted to:
(i) support organic materials during preparation of the organic materials (e.g., support sandwich makings during preparation of a sandwich); and/or
(ii) contain the organic materials during transport and/or storage (e.g., contain the sandwich during transport to another location); and/or
(iii) contain the organic materials which are to be discarded so that the multipurpose compostable absorption mat and organic materials can be composted together (e.g., encapsulate the sandwich remnants, and then the mat and the sandwich remnants are composted together).

The organic materials can be foods and/or other organic materials such as oils, fluids, juices, fibrous materials, napkins, paper towels, toilet paper, fecal matter, etc.

The multipurpose compostable absorption mat generally comprises at least three portions:
a first portion for facing the organic materials, the first portion being configured to enable passage of greases and/or liquids therethrough (e.g., the first portion may comprise parchment paper or a parchment-like paper having pinholes or other openings or porosity that enable passage of greases and/or liquids therethrough);
a second portion outboard of the first portion, the second portion being configured to enable the absorption of greases and/or liquids seeping through the first portion (e.g., the second portion may comprise a deliquescent material such as banana pulp, corn starch or a granulated rice material, or a combination of such materials, that enables the absorption of greases and/or liquids seeping through the first portion, e.g., via a capillary mechanism); and
a third portion outboard of the second portion, the third portion being configured to restrict the passage of greases, liquids and other organic materials (e.g., the third portion may comprise a plant-based corn starch material having plastic-like characteristics including liquid impermeability).

In one form of the invention, the mat portions are compressed together, having approximately the thickness of a sheet of paper or a paper towel or a dinner napkin.

Preferably the entire multipurpose compostable absorption mat is formed out of compostable materials, so that the entire mat is compostable.

The multipurpose compostable absorption mat retains its structural integrity when receiving and transporting the organic material. However, after a duration, the mat and the organic material contained within the mat break down into compost. The speed and extent of breakdown depends on multiple external factors, such as temperature, humidity, compression, the amount of organic material contained, and the liquid content of the organic material, i.e., the amount of water in the organic material. In one non-limiting embodiment, both the mat and the organic material disintegrate in a 90-day period or a 180-day period.

The deliquescent material of the second portion works to dissolve as moisture is received from the first portion. However, the moisture does not pass through to the third portion. This maintains a clean outer surface when it is handled to place the mat in a compost bin, and keeps the surface beneath the mat clean when the mat is receiving the organic material. After a duration in the waste site, the mat and organic matter dissolve. This results in less stress on landfills, dumps, and other waste sites. Further, the decomposition process of the mat creates methane gas which can be captured and used as a renewable energy source.

The multipurpose compostable absorption mat can be used to support organic materials during preparation of the organic materials, contain the organic materials during transport and/or storage, and contain any waste organic materials so that the mat and the waste organic materials can be composted together.

Thus, in one form of the invention, the multipurpose compostable absorption mat may be configured as a food preparation mat or as a cutting mat for use during food preparation, and may be used to encapsulate any organic waste material such that the mat and the organic waste material can be composted together.

In another form of the invention, the multipurpose compostable absorption mat may be used as a mat on which to prepare a sandwich, the sandwich may be wrapped in the mat for transport to another location, and any sandwich waste may be wrapped in the mat so that the mat and the sandwich waste may be composted together.

In another form of the invention, the multipurpose compostable absorption mat can be used to form a pizza box, so that the cooked pizza can be placed inside the pizza box, transported to another location, and then the pizza box can be used to encapsulate any discarded pizza, with the pizza box and the discarded pizza being composted together.

In another form of the invention, the multipurpose compostable absorption mat can be used to form a liner for a pizza box, so that the liner and the discarded pizza can be composted together and the remainder of the pizza box recycled.

In some embodiments, the aforementioned at least three portions of the multipurpose compostable absorption mat are formed as at least three discrete layers (i.e., a first layer facing the organic materials, a second layer outboard of the first layer, and a third layer outboard of the second layer), with the three discrete layers attached to one another so as to form the mat.

In some embodiments, the aforementioned at least three portions of the multipurpose compostable absorption mat may not be formed as discrete layers, and may instead simply comprise regions within a single structure.

Since the multipurpose compostable absorption mat is intended to have its first portion facing the organic materials, it can be desirable to mark (e.g., with writing or a picture) one of the faces of the mat to indicate which face should receive the organic material. This marking allows the user to orient the mat as appropriate.

In some situations it may be undesirable or inconvenient to require the user to orient the mat so that a particular face of the mat faces the organic material (i.e., to orient the mat so that the face of the mat presenting the first portion is set to receive the organic material). To this end, it can be convenient to construct the mat with a "mirrored" construction so that each face of the mat presents an aforementioned first portion of the mat. In this mirrored construction, the mat preferably comprises at least five "sequenced" portions, e.g., a first portion, a second portion, a third portion, another second portion and then another first portion, with the two first portions providing the two faces of the mat. With this mirrored construction, either face of the mat can be used to receive the organic material. Such a construction can be highly advantageous (e.g., in a fast food setting) since there is no need for the user to orient the mat so that a particular face of the mat receives the organic material.

If desired, the multipurpose compostable absorption mat may be provided in sheets of predetermined dimensions, e.g., 24 inches by 24 inches, 36 inches by 36 inches, etc. Alternatively, the multipurpose compostable absorption mat may be provided in roll form, in which case the mat may be provided with perforations traversing the width of the unrolling material in order to assist the user in tearing off a desired length of the unrolling material. Or the roll form of the multipurpose compostable absorption mat may be used in conjunction with a dispenser equipped with a cutting mechanism (e.g., a rigid cutting bar with teeth-like elements).

The present invention is highly advantageous, since it is able to quickly break down compostable matter/food scraps/ organic matter/produce by containing the waste or excess spillage in a compostable mat.

The present invention also enables efficient cleanup of organic material.

And the present invention can be used to help restaurants and kitchens more efficiently discard organic material while maintaining levels of cleanliness, lessening risk of food contamination, and providing a quick clean up.

The present invention also facilitates collecting and discarding industrial materials, such as oils, fibrous material, and other industrial organic waste, for compostable discarding.

In one form of the invention, there is provided a multipurpose compostable absorption mat for supporting and/or containing organic materials, the mat comprising:

a first portion for facing the organic materials, wherein the first portion is configured to enable passage of greases and/or liquids therethrough;

a second portion outboard of the first portion, wherein the second portion is configured to enable the absorption of greases and/or liquids seeping through the first portion; and a third portion outboard of the second portion, wherein the third portion is configured to restrict the passage of greases and/or liquids therethrough.

In another form of the invention, there is provided a method for supporting and/or containing organic materials, the method comprising:

providing a multipurpose compostable absorption mat, the mat comprising:

a first portion for facing the organic materials, wherein the first portion is configured to enable passage of greases and/or liquids therethrough;

a second portion outboard of the first portion, wherein the second portion is configured to enable the absorption of greases and/or liquids seeping through the first portion; and a third portion outboard of the second portion, wherein the third portion is configured to restrict the passage of greases and/or liquids therethrough;

placing the organic materials on the first portion of the mat;

wrapping the organic materials in the mat; and compositing the mat and the organic materials together.

In another form of the invention, there is provided a method for supporting and/or containing organic materials, the method comprising:

providing a multipurpose compostable absorption mat, the mat comprising:

a first portion for facing the organic materials, wherein the first portion is configured to enable passage of greases and/or liquids therethrough;

a second portion outboard of the first portion, wherein the second portion is configured to enable the absorption of greases and/or liquids seeping through the first portion;

a third portion outboard of the second portion, wherein the third portion is configured to restrict the passage of greases and/or liquids therethrough;

an additional second portion outboard of the third portion, wherein the additional second portion is configured to enable the absorption of greases and/or liquids; and an additional first portion outboard of the additional second portion, wherein the additional first portion is configured to enable passage of greases and/or liquids therethrough to the additional second portion;

placing the organic materials on one of the first portion of the mat and the additional first portion of the mat;
wrapping the organic materials in the mat; and
compositing the mat and the organic materials together.

BRIEF DESCRIPTION OF THE DRAWINGS

The invention will now be described, by way of example, with reference to the accompanying drawings, in which:

FIG. 8A illustrates another multipurpose compostable absorption mat formed in accordance with the present invention, wherein the aforementioned at least three portions of the mat have different thicknesses, and further wherein the portions may each be uniform or non-uniform within their specific portions;

Like reference numerals refer to like parts throughout the various views of the drawings.

DETAILED DESCRIPTION OF THE PREFERRED EMBODIMENTS

Figure 1:
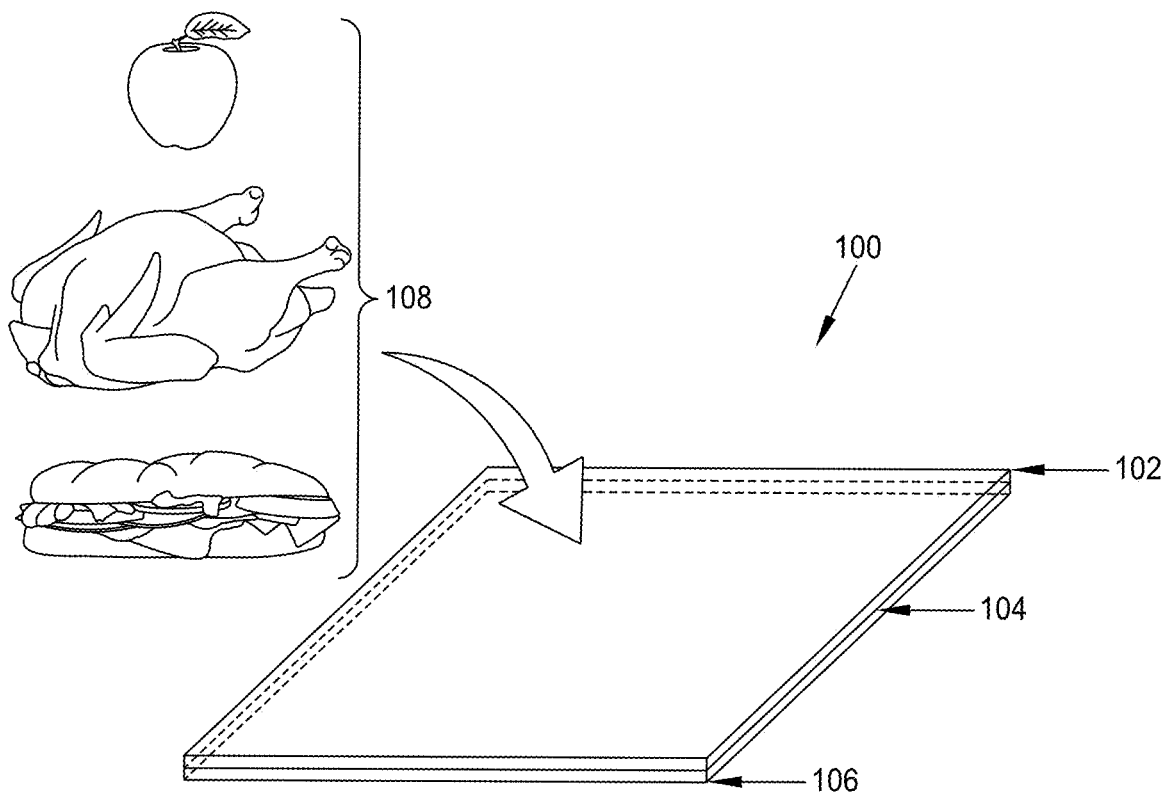
FIG. 1 illustrates a multipurpose compostable absorption mat formed in accordance with the present invention.

The following detailed description of the preferred embodiments of the invention is intended to be merely exemplary in nature and is not intended to limit the described embodiments and/or the uses of the described embodiments. As used herein, the word "exemplary" or "illustrative" means "serving as an example, instance, or illustration". Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2:
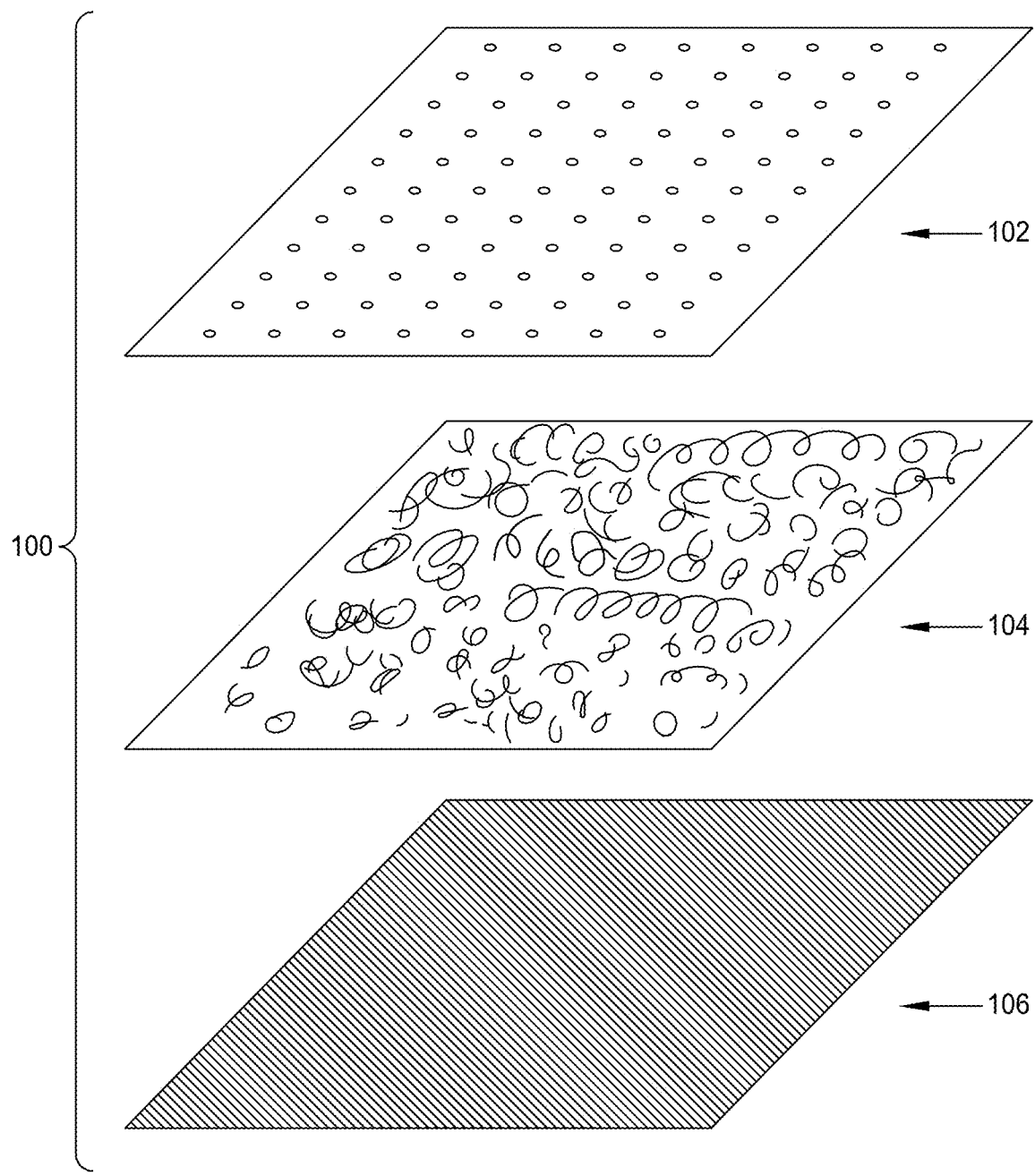
FIG. 2 illustrates an exploded view of the mat shown in FIG. 1, showing the aforementioned at least three portions of the mat.
Figure 3:
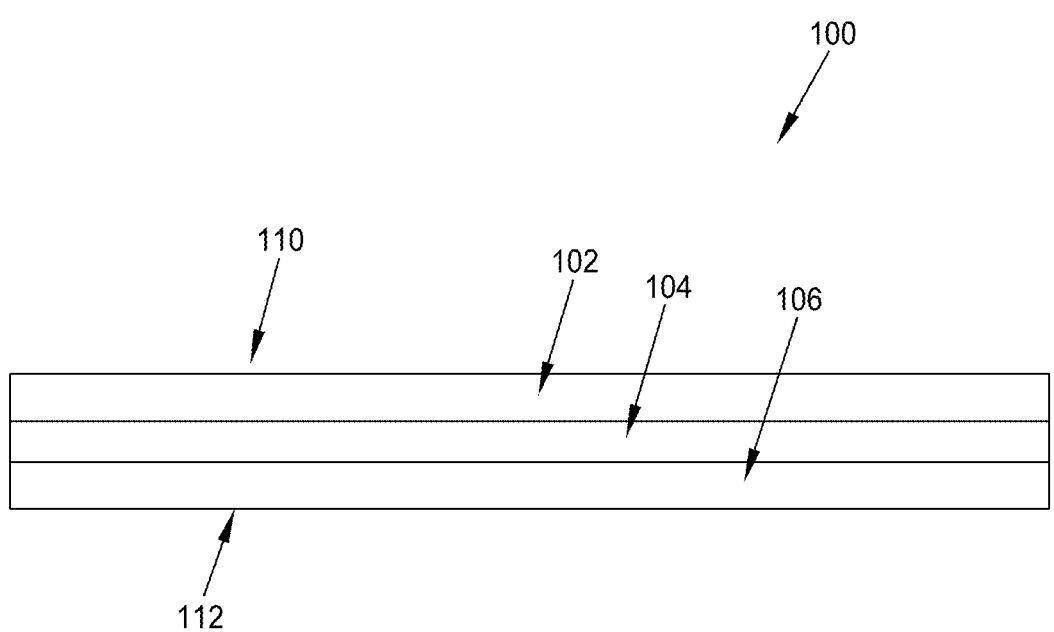
FIG. 3 illustrates a side view of the multipurpose compostable absorption mat shown in FIGS. 1 and 2.

In one embodiment of the present invention, and looking now at FIGS. 1-3, there is provided a multipurpose compostable absorption mat 100, sometimes hereinafter referred to herein as "the multipurpose compostable absorption mat", "mat 100" or "the mat". Mat 100 is configured to:

(i) support organic materials during preparation of the organic materials (e.g., support sandwich makings during preparation of a sandwich); and/or (ii) contain the organic materials during transport and/or storage (e.g., contain the sandwich during transport to another location); and/or (iii) contain the organic materials which are to be discarded so that the multipurpose compostable absorption mat and organic materials can be composted together (e.g., encapsulate the sandwich remnants, and then the mat and the sandwich remnants are composted together).

The organic materials may include, without limitation, food, oils, fluids, juices, fibrous material, napkins, paper towels, toilet paper, fecal matter, etc.

In accordance with the present invention, both mat 100 and waste organic material simultaneously disintegrate in a composting process. This process recycles the organic materials otherwise regarded as waste products. Thus, the compostable disposal of the organic material is efficacious for reducing pressure on landfills and creating a greener community.

The mat 100 generally comprises at least three portions:

a first portion 102 for facing the organic materials 108, the first portion 102 being configured to enable passage of greases and/or liquids therethrough (e.g., first portion 102 may comprise parchment paper or a parchment-like paper having pinholes or other openings or porosity that enable passage of greases and/or liquids);

a second portion 104 outboard of the first portion 102, the second portion being configured to enable the absorption of greases and/or liquids seeping through the first portion (e.g., second portion 104 may comprise a deliquescent material such as banana pulp, corn starch or a granulated rice material, or a combination of such materials, that enables the absorption of greases and/or liquids seeping through the first portion, e.g., via a capillary mechanism); and a third portion 106 outboard of the second portion 104, the third portion 106 being configured to restrict the passage of greases, liquids and other organic materials (e.g., third portion 106 may comprise a plant-based corn starch material having plastic-like characteristics including liquid impermeability).

The mat 100 is flexible, compostable, and food-friendly in design; and thus, can be filled with organic material 108 and other compost matter, for disposal in a landfill, where the mat 100 and the organic material are simultaneously compostable. During the composting process, the mat encapsulates heat while extracting moisture from the organic material which accelerates the decomposition process. The configuration of mat 100, with each portion serving a unique purpose, enhances this composting effect.

In one embodiment, the mat 100 is defined by a flat, lightweight configuration providing two faces 110 and 112. As seen in FIG. 3, face 110 is formed on first portion 102, and face 112 is formed on third portion 106. Thus, in this form of the invention, face 110 is intended to receive the organic material and face 112 is intended to remain untouched by the organic material or its breakdown byproducts. In embodiments, mat 100 is flexible. The at least three portions of mat 100 (i.e., first portion 102, second portion 104 and third portion 106) may be defined by multiple layers configured in an adjacent, parallel arrangement, such as is shown in FIGS. 1-3.

The first portion 102 is configured to directly engage edible or organic matter, i.e., on its face 110. The first portion 102 is configured to enable passage of greases, liquids, etc. therethrough without affecting the taste of the food or food preparation process and lessens the chance of cross contamination. In one form of the invention, the first portion 102 comprises parchment paper or a parchment-like paper that is defined by multiple pinholes or other openings or porosity sized and dimensioned to enable passage of greases, liquids, and organic material 108. If desired, first portion 102 may comprise an anti-microbial and/or anti-bacterial material (e.g., on its face 110).

The second portion 104 is disposed adjacent to, parallel to, and outboard of the first portion 102. Second portion 104 comprises a deliquescent material. It will be appreciated that a deliquescent material dissolves into a liquid in an accelerated manner and also absorbs moisture. The deliquescent material of the second portion 104 enables the absorption of greases and liquids seeping through the first portion 102, e.g., via a capillary mechanism. It will be appreciated that the capillary mechanism forces the grease and liquid from the first portion 102 to flow in a narrow space without the assistance of, or even in opposition to, external forces like gravity. Those skilled in the art will recognize that such capillary motion occurs because of intermolecular forces between the liquid and surrounding solid layers.

In one non-limiting embodiment, the second portion 104 comprises a banana pulp, corn starch, or other deliquescent material, or a combination of such materials. Those skilled in the art will also recognize that plant fibers, such as banana pulp and banana stem fibers, have a natural absorbency and high-water retention properties. Also, the banana pulp does not require chemical processing, allowing for an all-natural mat makeup.

The third portion 106 is disposed adjacent to, parallel to, and outboard of the second portion 104. Third portion 106 comprises an impermeable material that restricts passage of liquids or greases. In one non-limiting embodiment, the third portion 106 comprises a plant/corn starch-based plastic-like outer layer which is liquid impermeable. It should be appreciated that the outer face 112 of third portion 106 is free of liquids or greases emanating from the organic materials contacting face 110 of first portion 102 due to the liquid impermeability of third portion 106.

In one form of the invention, the mat portions 102, 104, 106 are compressed together, having approximately the thickness of a sheet of paper or a paper towel or a dinner napkin.

Preferably the entire multipurpose compostable absorption mat 100 is formed out of compostable materials, so that the entire mat is compostable. Thus, first portion 102, second portion 104 and third portion 106 are all formed out of compostable materials. In one preferred form of the invention, at least the third portion 106 of the mat 100 (and preferably the entire mat) is compostable in about 90 days or about 180 days. Note that the mat is formed out of compostable materials which, upon breakdown, do not harm the environment (unlike some biodegradable plastics which, upon breakdown, are still harmful for the environment, affecting the ground soil and killing wildlife).

Further, the mat 100 is flexible enough to be rolled or manipulated into a container-like compost receptacle that is suitable for capturing and discarding food/organic waste 108 and compost materials.

Mat 100 retains its structural integrity when receiving and transporting the organic material 108. However, after a duration, mat 100 and organic material 108 break down into compost. The speed and extent of breakdown depends on multiple external factors, such as temperature, humidity, compression, amount of organic material 108 contained, and the liquid content of the organic material, i.e., amount of water in the organic material. In one non-limiting embodiment, both mat 100 and organic material 108 disintegrate in a 90-day period or a 180-day period. However, the duration for compost disintegration may be more or less days, depending on at least the aforementioned compost factors. By maintaining structural integrity in such a manner, the mat is more easily filled and transported with organic material 108, which may be fluidic or have a high viscosity.

The deliquescent material of the second portion 104 works to dissolve as moisture is received from the first portion 102. However, the moisture does not pass through to face 112 of third portion 106 due to the liquid impermeability of third portion 106. This maintains a clean outer surface (i.e., face 112) when it is handled to place the mat 100 in a compost bin, and keeps the surface beneath face 112 of the mat 100 clean when the mat is receiving the organic material. After a duration in the waste site, the mat 100 dissolves with the organic material. This results in less stress on landfills, dumps, and other waste sites. Further, the decomposition process of the mat creates methane gas which can be captured and used as a renewable energy source.

In use, organic material 108 can be processed directly on the first portion 102. Grease and moisture are absorbed by the second portion 104, but are not allowed to pass through the impermeable third portion 106. If desired, mat 100 can be used to contain the organic material, e.g., for transport or storage. When it is desired to dispose of the organic material 108, the excess organic material 108 is wrapped in the mat 100 and disposed of in a compost and/or compostable waste container.

Figure 4:
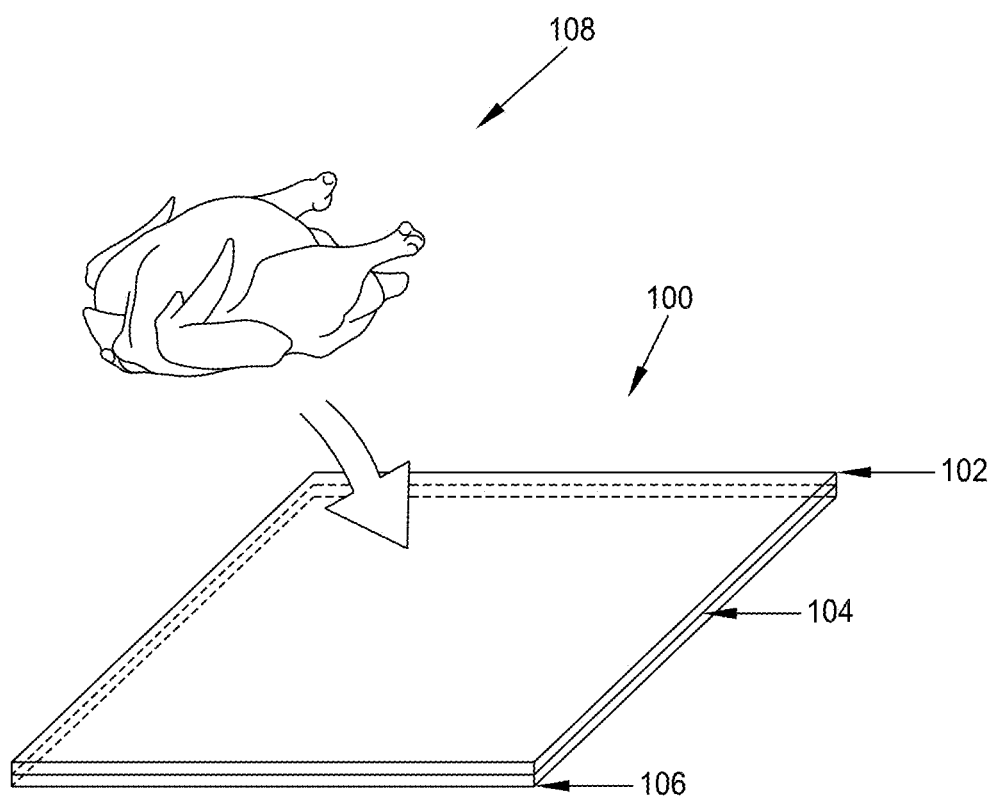
FIG. 4 illustrates one exemplary application wherein the multipurpose compostable absorption mat is used as a food preparation mat or cutting mat.

Thus, in one form of the invention, and looking now at FIG. 4, the multipurpose compostable absorption mat 100 may be configured as a food preparation mat or as a cutting mat for use during food preparation, and may be used to encapsulate any organic waste material such that the mat and the organic waste material can be composted together.

Figure 5:
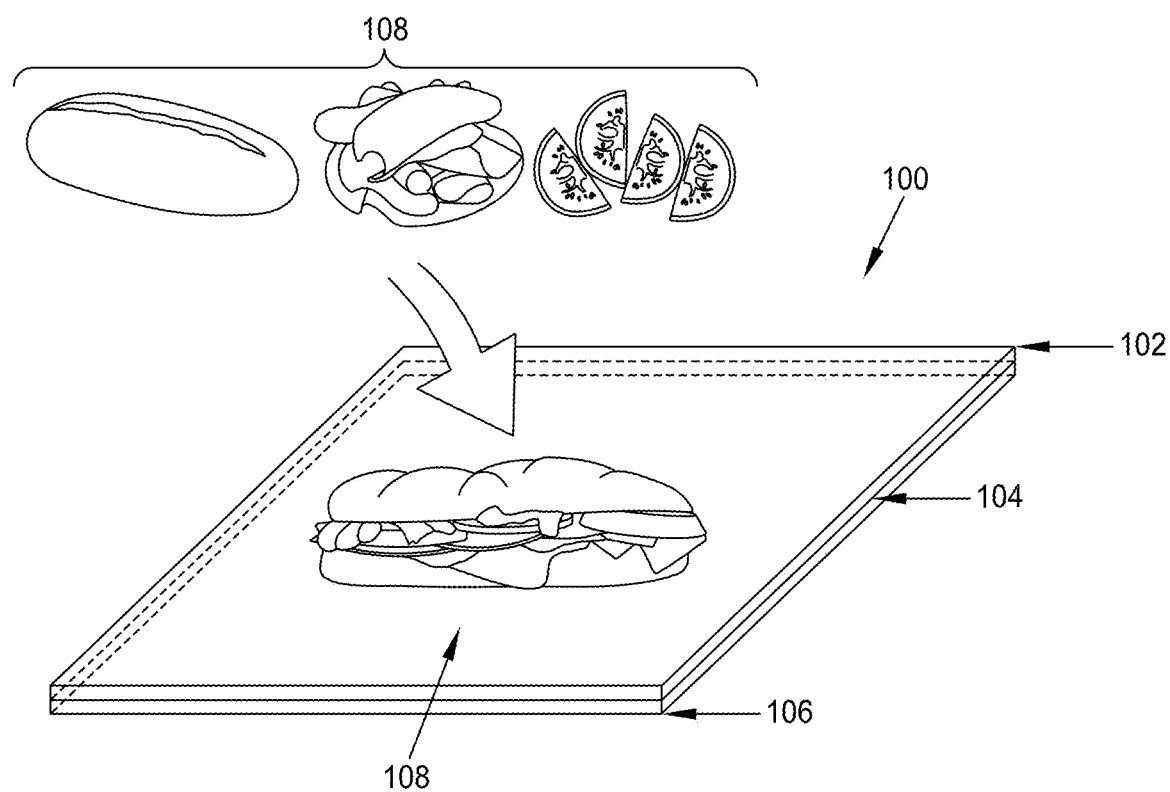
FIG. 5 illustrates another exemplary application wherein the multipurpose compostable absorption mat is used as a sandwich preparation mat.

In another form of the invention, and looking now at FIG. 5, the multipurpose compostable absorption mat 100 may be used as a mat on which to prepare a sandwich, the sandwich may be wrapped in the mat for transport to another location, and any sandwich waste may be wrapped in the mat so that the mat and the sandwich waste may be composted together.

Figure 6:
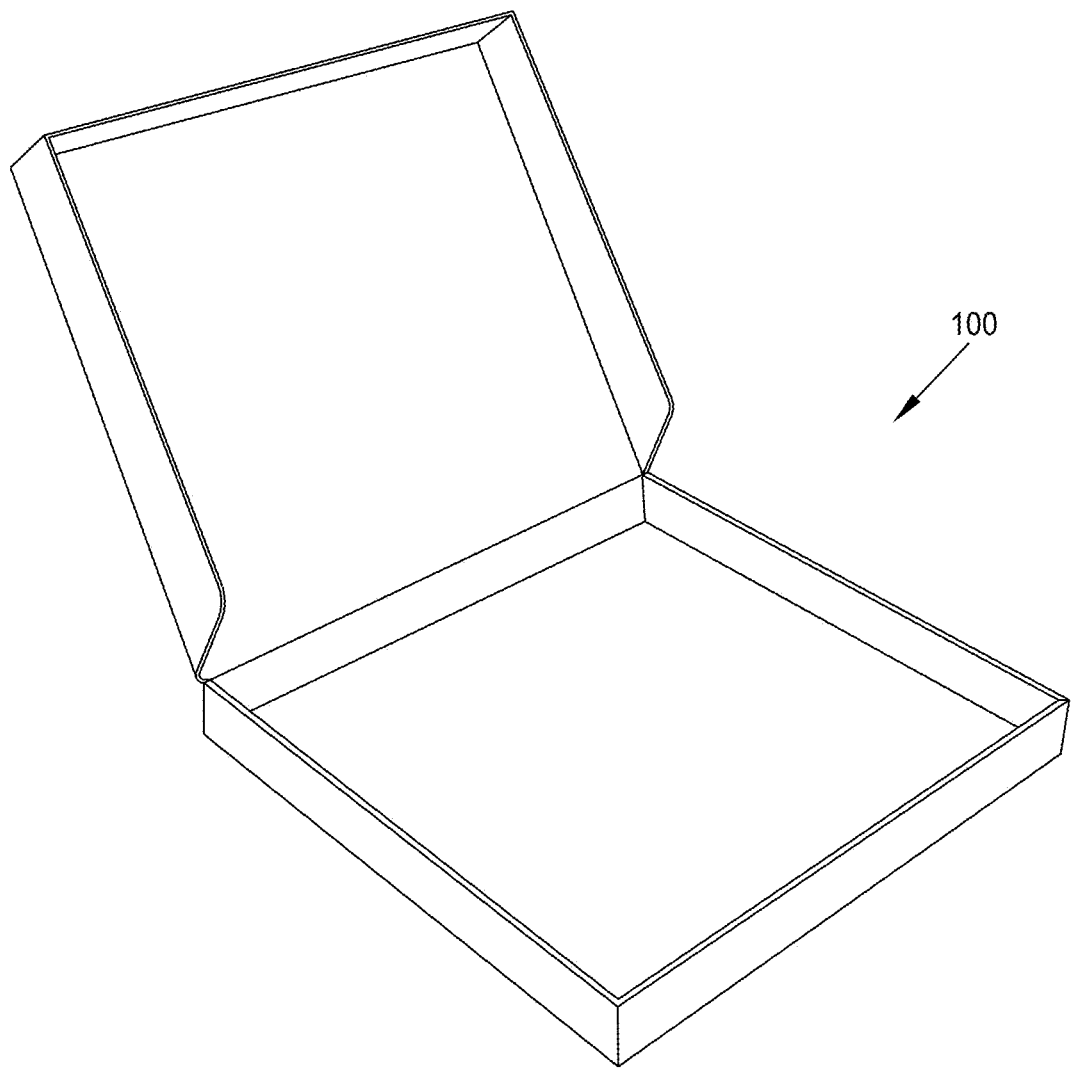
FIG. 6 illustrates another exemplary application wherein the multipurpose compostable absorption mat is used as a pizza box.

In another form of the invention, and looking now at FIG. 6, the multipurpose compostable absorption mat 100 can be used to form a pizza box, so that the cooked pizza can be placed inside the pizza box, transported to another location, and then the pizza box can be used to encapsulate any discarded pizza, with the pizza box and the discarded pizza being composted together.

Figure 7:
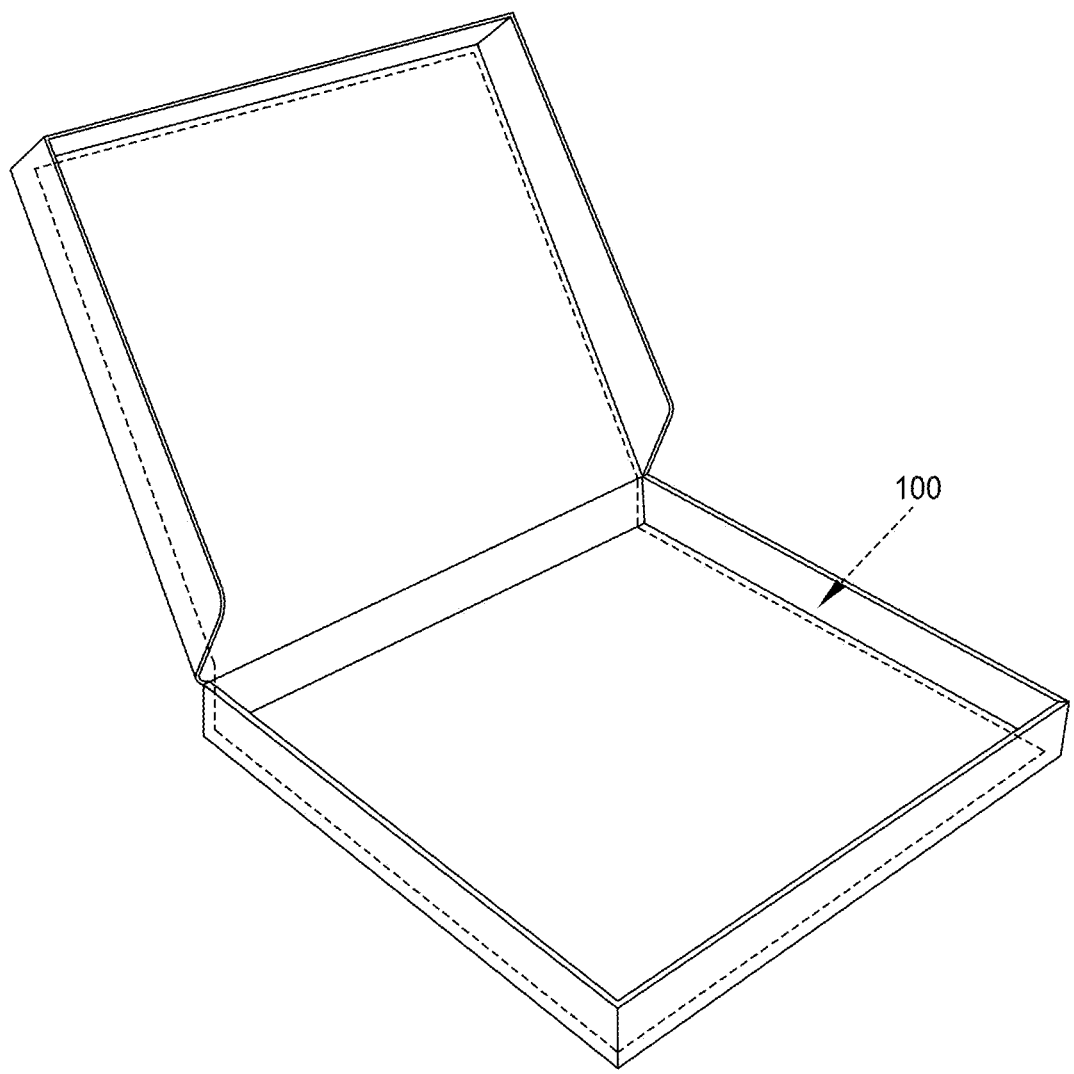
FIG. 7 illustrates another exemplary application wherein the multipurpose compostable absorption mat is used as a liner for a pizza box.

In one preferred form of the invention, and looking now at FIG. 7, the multipurpose compostable absorption mat 100 can be used to form a liner for a pizza box, so that the liner and the discarded pizza can be composted together and the remainder of the pizza box recycled.

In one embodiment, the at least three portions 102, 104, 106 of the multipurpose compostable absorption mat 100 are formed as at least three discrete layers (i.e., a first layer 102 facing the organic materials, a second layer 104 outboard of the first layer, and a third layer 106 outboard of the second layer), with the three discrete layers attached to one another so as to form the mat. See FIGS. 1-3. In one non-limiting embodiment, the mat layers 102, 104, 106 are compressed together so as to form a mat having thickness in the range of the thickness of a sheet of paper or a paper towel or a napkin to about ¾" or more.

Figure 8:
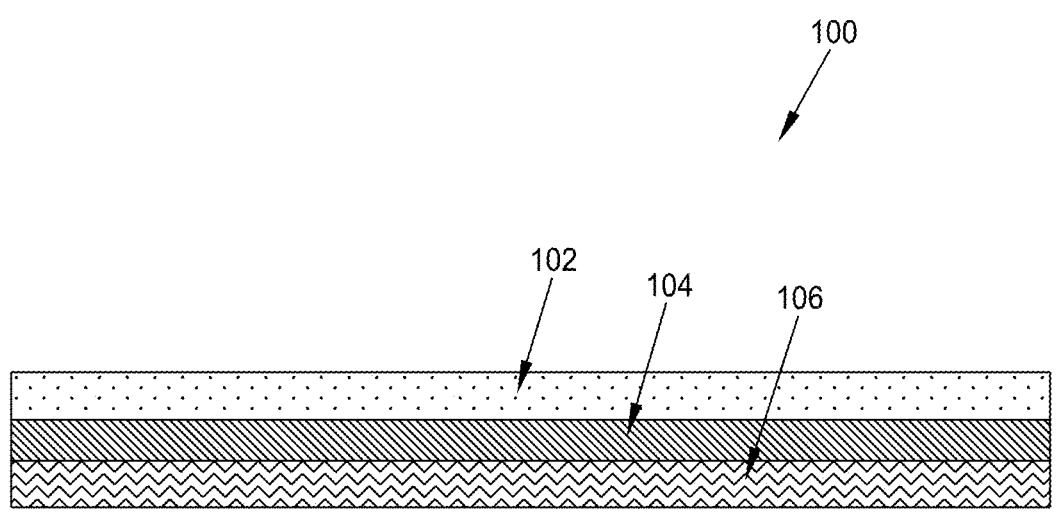
FIG. 8 illustrates another multipurpose compostable absorption mat formed in accordance with the present invention, wherein the aforementioned at least three portions of the multipurpose compostable absorption mat are not formed as discrete layers, and instead are formed as regions within a single structure.

In another embodiment, the at least three portions 102, 104, 106 of the multipurpose compostable absorption mat 100 may not be formed as discrete layers, and may simply comprise regions within a single structure. See FIG. 8.

In addition to the foregoing, it should be appreciated that portions 102, 104 and 106 may have equal or different thicknesses, and the portions 102, 104 and 106 may each be uniform or non-uniform within their specific portions. Thus, for example, and looking now at FIG. 8A, mat 100 may comprise a relatively thin first portion 102 and a relatively thin third portion 106, and a relatively thick second portion 104. Furthermore, second portion 104 may be non-uniform within that specific portion. By way of example but not limitation, second portion 104 may comprise (i) regions 104A having a higher capacity to absorb the greases and liquids passing from the first portion 102, and (ii) regions 104B having a lower (or no) capacity to absorb the greases and liquids passing from the first portion 102. Note that where high absorption regions 104A are disposed within low (or no) absorption regions 104B, regions 104B are preferably configured to wick the greases and liquids emerging from first portion 102 toward the high absorption regions 104A.

Since the multipurpose compostable absorption mat is intended to have its first portion facing the organic materials, it can be desirable to mark (e.g., with writing or a picture) one of the faces of the mat to indicate which face should receive the organic material. This marking allows the user to orient the mat as appropriate.

Figure 9:
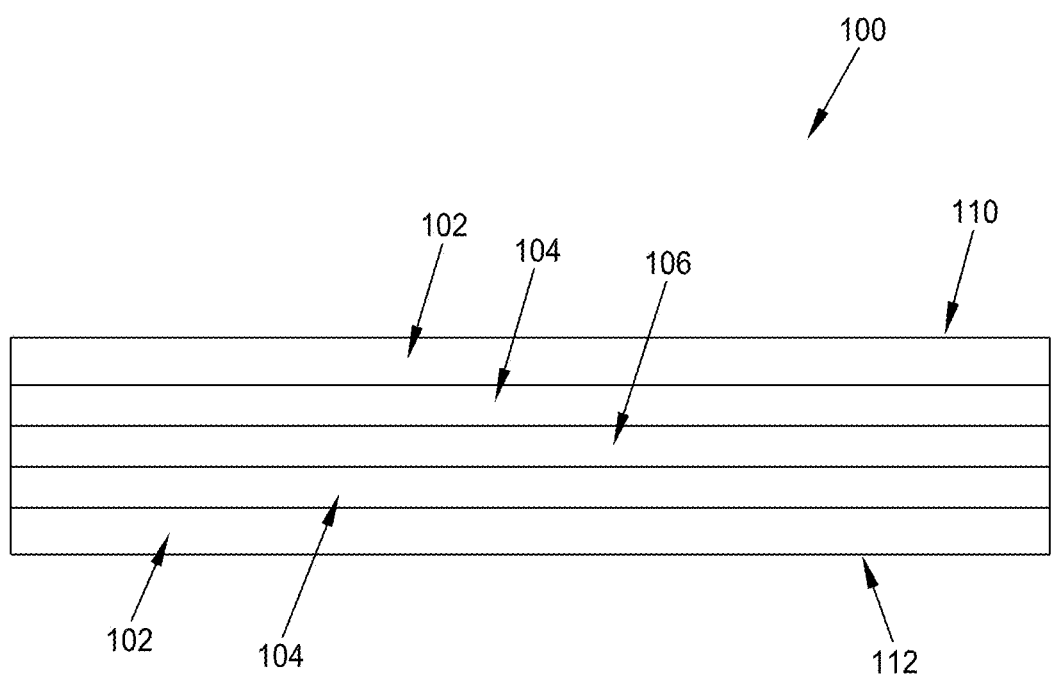
FIG. 9 illustrates another multipurpose compostable absorption mat formed in accordance with the present invention, wherein the mat comprises a "mirrored" construction utilizing at least five "sequenced" portions.

In some situations it may be undesirable or inconvenient to require the user to orient the mat so that a particular face of the mat faces the organic material (i.e., to orient the mat so that the face of the mat presenting the aforementioned first portion is set to receive the organic material). To this end, it can be convenient to construct the mat 100 with a "mirrored" construction so that each face of the mat is provided by a first portion 102 of the mat. In this mirrored construction, and looking now at FIG. 9, the mat 100 preferably comprises at least five "sequenced" portions, e.g., a first portion 102, a second portion 104, a third portion 106, another second portion 104 and then another first portion 102, with the two first portions 102 providing the two faces of the mat. With this mirrored construction, either of the two faces 110, 112 of the mat can be used to receive the organic material, and any greases or liquids passing through a first portion 102 will be absorbed by a second portion 104 and stopped by the third portion 106. Such a construction can be highly advantageous (e.g., in a fast food setting) since there is no need for the user to orient the mat so that a particular face of the mat receives the organic material.

If desired, the multipurpose compostable absorption mat 100 may be provided in sheets of predetermined dimensions, e.g., 24 inches by 24 inches, 36 inches by 36 inches, etc. Alternatively, the multipurpose compostable absorption mat 100 may be provided in roll form, in which case the mat may be provided with perforations traversing the width of the unrolling mat in order to assist even tearing by the user. Or the roll form of the multipurpose compostable absorption mat may be used in conjunction with a dispenser equipped with a cutting mechanism (e.g., a rigid cutting bar with teeth-like elements).

Figure 10:
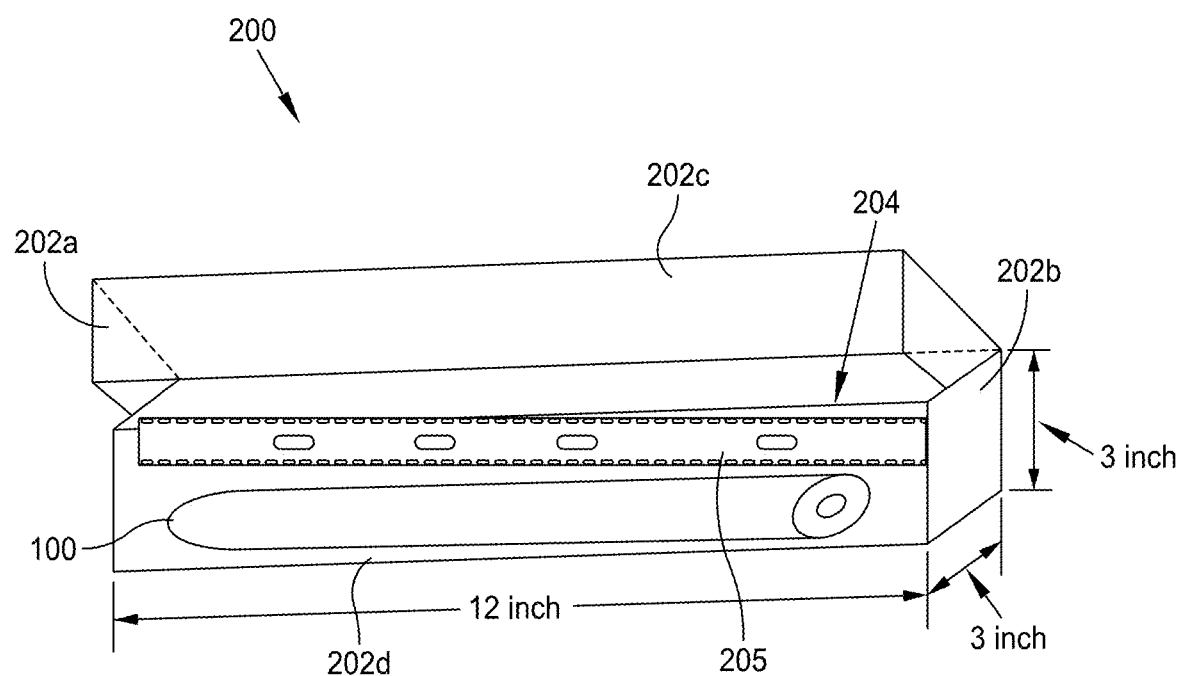
FIG. 10 illustrates a perspective view of a roller dispenser for dispensing the multipurpose compostable absorption mat.

Turning now to FIG. 10, the present invention provides a unique dispenser 200 that is sized and dimensioned to receive the mat 100 in a rolled-up configuration for easy-roll dispensing. The dispenser comprises multiple sidewalls 202a, 202b, 202c, 202d that form a cavity 204, which is sized and dimensioned to receive the mat 100 in a rolled-up configuration. The dispenser 200 also includes an axle (not shown) that is disposed longitudinally across the cavity. The axle carries the rolled-up mat 100 for unrolling when dispensing.

In operation, the user can pull out a section of the mat 100 from the dispenser 200; lay out the mat 100 on a flat surface, or place the mat 100 inside a bin or other container, with the first portion 102 facing up; cut off the unrolled section from the remainder of the roll using cutting bar; place organic material 108 on the first portion 102; support or contain the organic material 108 as desired; when waste organic material is to be disposed of, wrap up the waste organic material 108 for disposal; and transfer the mat 100 and organic material 108 to a dump site/land-fill. At the land fill, the entirety of mat 100 and foods waste 108 dissolves in a compostable manner after a duration.

Thus, in one form of the invention, there is provided apparatus comprising:

a multipurpose compositable absorption mat 100 comprising:

a first portion 102 facing the organic materials, defined by parchment paper or a parchment-like paper having multiple pinholes or other openings or porosity sized and dimensioned to enable passage of grease and/or liquid;

a second portion 104 outboard of the first portion 102, defined by a deliquescent material, the second portion operable to absorb the grease and the liquid from the first portion through a capillary mechanism;

a third portion 106 outboard of the second portion 104, defined by an impermeable plant/corn starch-based plastic-like material which is liquid impermeable, the third portion being decomposable; and a dispenser 200 comprising sidewalls 202a-202d forming a cavity 204, the cavity 204 being sized and dimensioned to receive the mat 100, the dispenser further comprising an axle disposed longitudinally across the cavity, the axle carrying the mat 100 in a rolled configuration for dispensing the mat 100, the dispenser further comprising a rigid cutting bar 205 (with teeth-like elements) that extends along a longitudinal of the sidewall.

The present invention is highly advantageous, since it is able to facilitate the breakdown of compostable matter/food scraps/organic matter/produce by containing the waste or excess spillage in a compostable mat.

The present invention also enables efficient cleanup of organic material.

And the present invention can be used to help restaurants and kitchens more efficiently discard organic material while maintaining levels of cleanliness, lessening risk of food contamination, and providing a quick clean up.

The present invention also facilitates collecting and discarding industrial materials, such as oils, fibrous material, and other industrial organic waste, for compostable discarding.

MODIFICATIONS

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A multipurpose absorption mat for supporting and/or containing organic materials on a first side of the mat or on a second side of the mat, the mat comprising:
   a first portion for facing the organic materials, wherein the first portion is configured to enable passage of greases and/or liquids therethrough;
   a second portion outboard of the first portion, wherein the second portion is configured to enable the absorption of greases and/or liquids seeping through the first portion;
   a third portion outboard of the second portion, wherein the third portion is configured to restrict the passage of greases and/or liquids therethrough;
   an additional second portion outboard of the third portion, wherein the additional second portion is configured to enable the absorption of greases and/or liquids; and
   an additional first portion outboard of the additional second portion, wherein the additional first portion is configured to enable passage of greases and/or liquids therethrough to be absorbed by the additional second portion.

2. A mat according to claim 1 wherein the organic materials comprise at least one from the group consisting of foods, oils, fluids, juices, fibrous materials, napkins, paper towels, toilet paper and fecal matter.

3. A mat according to claim 1 wherein the first portion comprises a parchment paper or a parchment-like paper.

4. A mat according to claim 1 wherein the first portion comprises at least one from the group consisting of pinholes, other openings and porosity for enabling the passage of greases and/or liquids therethrough.

5. A mat according to claim 1 wherein the first portion comprises at least one from the group consisting of an anti-microbial material and an anti-bacterial material.

6. A mat according to claim 1 wherein the second portion enables the absorption of greases and/or liquids through a capillary mechanism.

7. A mat according to claim 1 wherein the third portion comprises a plant-based corn starch material having plastic-like characteristics including liquid impermeability.

8. A mat according to claim 1 wherein the first portion comprises a first face and the additional first portion comprises a second face, and further wherein at least one of the first face and the second face comprises a marking to allow a user to orient the mat as appropriate.

9. A mat according to claim 1 wherein composting of the mat creates methane gas.

10. A mat according to claim 1 wherein the first portion, the second portion, the third portion, the additional first portion and the additional second portion are formed as multiple layers configured in an adjacent, parallel arrangement.

11. A mat according to claim 1 wherein the first portion, the second portion, the third portion, the additional first portion and the additional second portion comprise regions within a single structure.

12. A mat according to claim 1 wherein the mat is in the form of sheets of predetermined dimensions.

13. A mat according to claim 1 wherein the mat is in roll form, and further wherein the mat comprises perforated lines extending across the width of the mat for enabling a user to tear off a portion from the roll.

14. A mat according to claim 1 wherein the mat is in the form of a pizza box.

15. A mat according to claim 1 wherein the mat is in the form of a liner for a pizza box.

16. A mat according to claim 1 wherein the second portion comprises a deliquescent material.

17. A mat according to claim 16 wherein the deliquescent material comprises at least one from the group consisting of banana pulp, corn starch and a granulated rice material.

18. A mat according to claim 1 wherein the first portion, the second portion, the third portion, the additional first portion and the additional second portion are all formed out of compostable materials.

19. A mat according to claim 18 wherein the mat is configured to disintegrate in one from the group consisting of a 90-day period and a 180-day period.

20. A mat according to claim 1 in combination with a dispenser, wherein the dispenser comprises:
   sidewalls forming a cavity, the cavity being sized and dimensioned to receive the mat in roll form; and
   a rigid cutting bar attached to one of the sidewalls.

* * * * *